(12) United States Patent
Kim et al.

(10) Patent No.: US 11,166,005 B2
(45) Date of Patent: Nov. 2, 2021

(54) THREE-DIMENSIONAL INFORMATION ACQUISITION SYSTEM USING PITCHING PRACTICE, AND METHOD FOR CALCULATING CAMERA PARAMETERS

(71) Applicant: INDUSTRY-UNIVERSITY COOPERATION FOUNDATION HANYANG UNIVERSITY, Seoul (KR)

(72) Inventors: Whol-Yul Kim, Seoul (KR); Joong-Sik Kim, Incheon (KR); Je Yeon Kim, Goyang-si (KR); Hong Jun Lee, Gumi-si (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 0 days.

(21) Appl. No.: 16/759,170

(22) PCT Filed: Oct. 27, 2017

(86) PCT No.: PCT/KR2017/012017
§ 371 (c)(1),
(2) Date: Apr. 24, 2020

(87) PCT Pub. No.: WO2019/083068
PCT Pub. Date: May 2, 2019

(65) Prior Publication Data
US 2020/0351488 A1 Nov. 5, 2020

(51) Int. Cl.
*H04N 13/246* (2018.01)
*H04N 13/128* (2018.01)
(Continued)

(52) U.S. Cl.
CPC ......... *H04N 13/246* (2018.05); *H04N 13/128* (2018.05); *H04N 13/239* (2018.05);
(Continued)

(58) Field of Classification Search
CPC ............... H04N 13/246; H04N 13/239; H04N 2013/0081; H04N 2013/0085
See application file for complete search history.

(56) References Cited

U.S. PATENT DOCUMENTS

2013/0162781 A1* 6/2013 Hubner ................ H04N 13/243
348/47
2018/0270427 A1* 9/2018 Damstra ............ H04N 5/23212

FOREIGN PATENT DOCUMENTS

KR 10-2005-0061115 A 6/2005
KR 10-2009-0102492 A 9/2009
(Continued)

*Primary Examiner* — Girumsew Wendmagegn
(74) *Attorney, Agent, or Firm* — Novick, Kim & Lee, PLLC; Jae Youn Kim; Sang Ho Lee (57) ABSTRACT

A three-dimensional information acquisition system using pitching practice, and a method for calculating camera parameters are disclosed. The method by which a server calculates camera parameters in order to obtain three-dimensional information, according to various embodiments of the present invention, can comprise the steps of: receiving, from at least two camera devices, image information of dynamic objects moving at a predetermined speed; confirming location information of each dynamic object, included in the image information, on the basis of the same time in each piece of image information received from each camera device; and calculating camera parameters, which indicate the relationship between the camera devices, by using at least a part of each piece of confirmed location information as a corresponding point.

10 Claims, 8 Drawing Sheets

(51) Int. Cl.
*H04N 13/239* (2018.01)
*H04N 13/00* (2018.01)

(52) U.S. Cl.
CPC ............... *H04N 2013/0081* (2013.01); *H04N 2013/0085* (2013.01)

(56) References Cited

FOREIGN PATENT DOCUMENTS

| | | |
|---|---|---|
| KR | 10-2010-0108021 A | 10/2010 |
| KR | 10-2011-0028232 A | 3/2011 |
| KR | 10-2013-0139365 A | 12/2013 |

\* cited by examiner

FIG. 1

PRIOR ART

THREE-DIMENSIONAL INFORMATION ACQUISITION SYSTEM USING PITCHING PRACTICE, AND METHOD FOR CALCULATING CAMERA PARAMETERS

BACKGROUND

1. Technical Field

Various embodiments of the present invention relate to a method of acquiring 3-dimensional information using multiple camera devices, more particularly to a method of calculating, configuring, or calibrating camera parameters between camera devices to acquire 3-dimensional information.

2. Description of the Related Art

Generally, two or more cameras are used for acquiring 3-dimensional information from images. In such a procedure, the acquisition of 3-dimensional information requires location information, i.e. geometric information, between the cameras.

In a camera system for 3-dimensional information acquisition, stereo calibration or stereo rectification procedures are performed using a multiple number of cameras in order to acquire external parameters (e.g. location information between cameras). Such a stereo calibration or rectification procedure may entail each camera device 110, 120 photographing reference patterns 130, 140 as in FIG. 1 and then acquiring the location information between camera devices, i.e. the camera parameters, by analyzing the photographed images.

Figure 1:
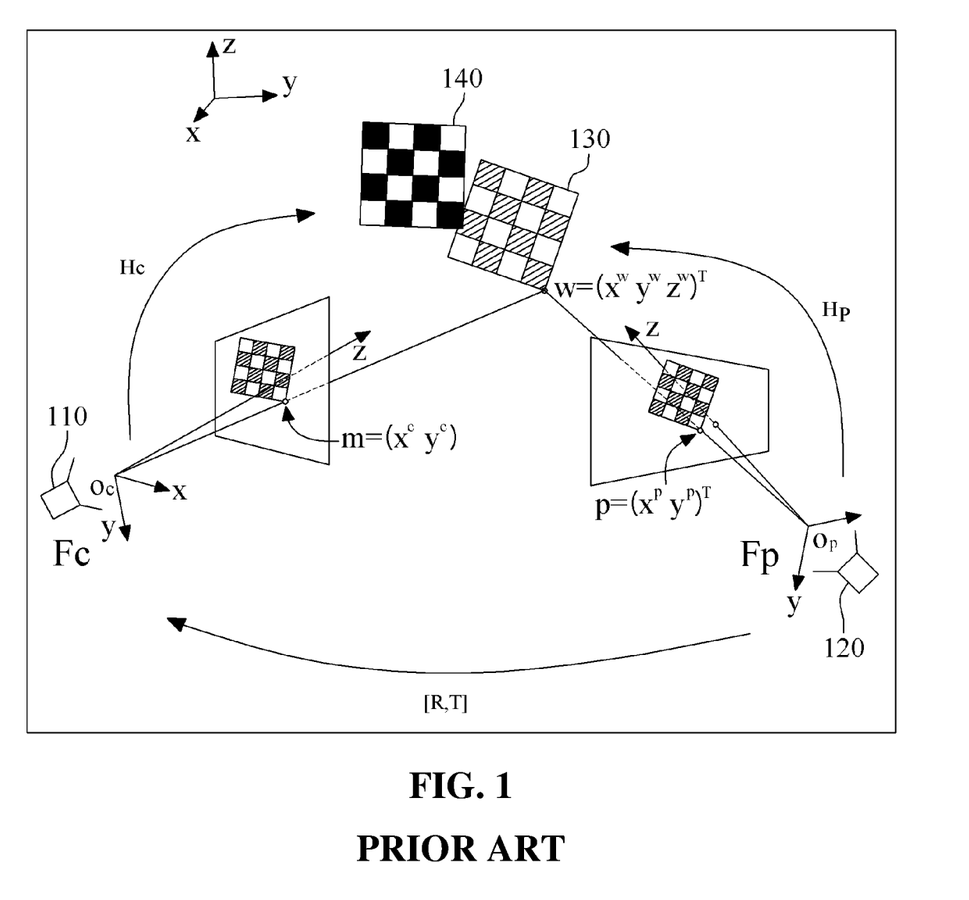
FIG. 1 is an example diagram illustrating a camera system for 3-dimensional information acquisition according to the related art.

Considering FIG. 1 in more detail, two camera devices 110, 120 can photograph images of a fixed pattern 130 from the left and right, respectively, to project the fixed pattern onto 2-dimensional coordinates. Thus, the 3-dimensional information of the fixed pattern can be acquired by using the photographed 2-dimensional images, the world coordinate system, and camera parameters (e.g. the distance between camera devices). The camera parameters can be acquired through a stereo calibration procedure performed on such a system.

SUMMARY OF THE INVENTION

A 3-dimensional information acquisition system such as that of FIG. 1 requires that the user personally photographing the fixed pattern with multiple camera devices or a single camera device.

However, it can be difficult to position the equipment for such stereo calibration using fixed patterns in places where there are moving objects (for example, in places for pitching practice, etc.), and it can be difficult to perform the stereo calibration efficiently under local or spatial limitations. In particular, when there is a great distance between the camera devices, it may be difficult to photograph the fixed pattern at the same time, and it may be difficult to photograph the fixed pattern such that the pattern is exposed in the entire image.

Also, when camera parameters have to be calibrated in a conventional camera system due to the deterioration of the initially installed camera system or changes in the system environment, the calibration may have to be performed again using a pattern or object.

Various embodiments of the present invention have been conceived to resolve the problems above, and an objective of the embodiments is to provide a method of calculating camera parameters by using a dynamic object such as a ball used during pitching practice, instead of a fixed pattern or a fixed object, during stereo calibration.

Also, various embodiments of the present invention carry an objective of providing a 3-dimensional information acquisition system that continuously performs calibrations of camera parameters from pitching images during a game to thereby guarantee accuracy for prolonged periods.

A method based on a variety of embodiments of the present invention can be a method of calculating camera parameters at a server for 3-dimensional information acquisition and can include: receiving image information of a dynamic object moving at a particular speed, from at least two or more camera devices; checking each set of location information of the dynamic object included in the image information received from each camera device at the same time; and calculating camera parameters representing a relationship between the camera devices by using at least a portion of each set of the checked location information as a corresponding point.

In a method of calculating camera parameters based on a variety of embodiments of the present invention, checking the location information of the dynamic object can include: extracting an image corresponding to the same time from each set of the image information; and checking plane coordinate information of an region in which the dynamic object is present in each of the extracted images.

In a method of calculating camera parameters based on a variety of embodiments of the present invention, the image information can include a ball thrown in a pitching practice space as the dynamic object.

In a method of calculating camera parameters based on a variety of embodiments of the present invention, calculating camera parameters can include: determining a first camera parameter based on the dynamic object moved during a first pitching practice; determining a second camera parameter based on the dynamic object moved during a second pitching practice followed by the first pitching practice; and correcting the first camera parameter based on the second camera parameter.

In a method of calculating camera parameters based on a variety of embodiments of the present invention, the camera parameters can represent distance information between the camera devices.

A method of calculating camera parameters based on a variety of embodiments of the present invention can further include: detecting consecutive 2-dimensional location information, which is associated with the movement of the dynamic object, from the image information; modeling a trajectory of the dynamic object as a $2^{nd}$ order curve based on the 2-dimensional location information; modifying the 2-dimensional location information such that 2-dimensional location information of the dynamic object deviating by a particular distance or greater from the $2^{nd}$ order curve is positioned on at least some points of the $2^{nd}$ order curve; and calibrating the camera parameter based on the modified 2-dimensional location information. In this case, the method of calculating camera parameters can further include: rendering 3-dimensional information, which represents the trajectory of the dynamic object and which includes consecutive 3-dimensional location information of the dynamic object, based on the calibrated camera parameter; modeling the trajectory of the dynamic object as a 3-dimensional plane based on the rendered 3-dimensional information; modifying the 3-dimensional location information such that 3-dimensional location information of the dynamic object deviating by a particular distance or greater from the 3-dimensional plane is positioned on at least some points of the 3-dimensional plane; and calibrating the camera parameter based on the modified 3-dimensional location information. Then, the method of calculating camera parameters can further include: calibrating the camera parameter by detecting new 2-dimensional location information based on the modified 3-dimensional location information and modifying the new 2-dimensional location information based on a new $2^{nd}$ order curve modeling.

A server based on a variety of embodiments of the present invention can be a server configured to calculate camera parameters for 3-dimensional information acquisition and can include: a communication unit; an image information receiver unit configured to receive image information of dynamic object moving at a particular speed, via the communication unit from at least two or more camera devices; an image analysis unit configured to check each set of location information of the dynamic object included in the image information received from each camera device at the same time; and a parameter calculation unit configured to calculate camera parameters representing a relationship between the camera devices by using at least a portion of each set of the checked location information as a corresponding point.

In a server based on a variety of embodiments of the present invention, the image analysis unit can extract an image corresponding to the same time from each set of the image information and can check the plane coordinate information of an region in which the dynamic object is present in each of the extracted images.

In a server based on a variety of embodiments of the present invention, the parameter calculation unit can determine a first camera parameter based on the dynamic object moved during a first pitching practice, determine a second camera parameter based on the dynamic object moved during a second pitching practice after the first pitching practice, and calibrate the first camera parameter based on the second camera parameter.

In a server based on a variety of embodiments of the present invention, the camera parameters can represent distance information between the camera devices.

A storage medium based on a variety of embodiments of the present invention can be a storage medium storing a program of instructions that are configured to calculate camera parameters at a server for 3-dimensional information acquisition, where the program of instructions can include: receiving image information of a dynamic object moving at a particular speed, from at least two or more camera devices; checking each set of location information of the dynamic object included in the image information received from each camera device at the same time; and calculating camera parameters representing a relationship between the camera devices by using at least a portion of each set of the checked location information as a corresponding point.

By calculating camera parameters at a place where pitching practicing, etc., is performed, based on a dynamic object (e.g. a ball) that can be photographed during the pitching practice instead of using a separate fixed object, it is possible to calculate a camera parameter or acquire 3-dimensional information in a simple manner without the need for separate arbitrary preparation procedures or unnecessary preparation procedures.

Also, by photographing the repeatedly performed pitching training procedures and analyzing the accumulated image information, it is possible to more accurately and conveniently acquire or calibrate camera parameters or 3-dimensional information.

DETAILED DESCRIPTION OF THE INVENTION

The advantages and features of the present invention, as well as methods of achieving the advantages and features, can be clearly understood with the embodiments described in detail below. However, the present invention is not limited to the embodiments disclosed below but can be implemented in various different forms, and the embodiments are provided merely to completely disclose the present invention and completely inform the person having ordinary skill in the field of art to which the present invention pertains of the scope of the present invention. The present invention is only to be defined by the scope of claims.

Unless otherwise defined, all terms used herein (including technical or scientific terms) can be used to convey the meanings commonly understood by those of ordinary skill in the field of art to which the present invention pertains. Also, terms defined in a generally used dictionary are not to be interpreted as having ideal or extreme meanings unless specifically so defined.

A "camera parameter" referred to herein can be a parameter that represents a relationship between camera devices in a process for acquiring 3-dimensional information using a multiple number of camera devices and applying stereo calibration. In one example provided in a non-limiting manner, a camera parameter can include location information between camera devices or distance information between camera devices.

Also, a "dynamic object" referred to herein can mean an object that is moving for a particular length of time. A dynamic object can refer to the object itself or to an image of the object included in a photographed image. For example, a dynamic object can be a baseball used at a pitching site or an image of the baseball.

Also, "3-dimensional information" referred to herein can include a 3-dimensional image representing the movement of a dynamic object.

The following describes a 3-dimensional information acquisition system 10 with reference to the accompanying drawings.

Figure 2:
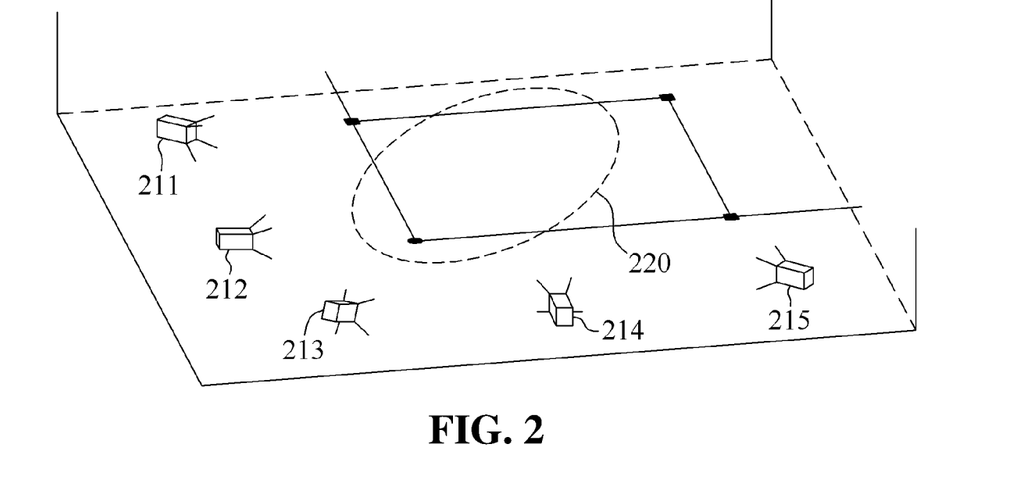
FIG. 2 is an example diagram illustrating a 3-dimensional information acquisition system according to various embodiments of the present invention.
Figure 3:
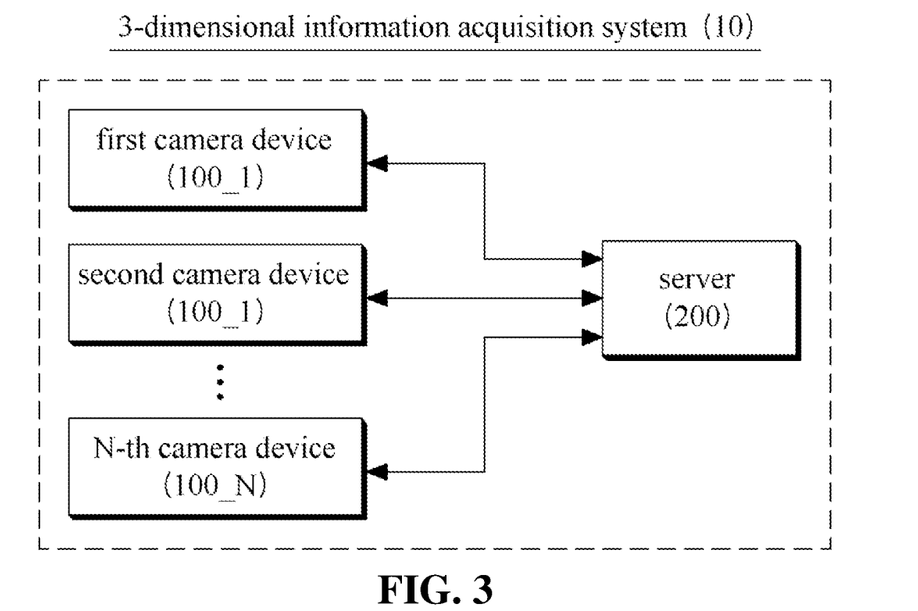
FIG. 3 is a block diagram of a 3-dimensional information acquisition system according to various embodiments of the present invention.

FIG. 2 is an example diagram illustrating a 3-dimensional information acquisition system 10 according to various embodiments of the present invention, and FIG. 3 is a block diagram of the 3-dimensional information acquisition system 10.

Referring to FIG. 2, in a 3-dimensional information acquisition system 10, a multiple number of camera devices 211 to 215 can photograph a dynamic object (e.g. a ball thrown by a pitcher) moving in a particular region (e.g. a pitching area 220). While it is not shown in FIG. 2, the 3-dimensional information acquisition system 10 can include a server. The server can perform the functions of receiving image information photographed from a multiple number of camera devices and using the dynamic object (e.g. ball) included in the image information to calculate, configure, or calibrate a camera parameter. Through an environment such as that shown in FIG. 2, it is possible to perform a function of calculating a camera parameter by using a moving object, in contrast to the method used in the related art.

Taking a closer look with FIG. 3, the 3-dimensional information acquisition system 10 can include at least one camera device 100_1 to 100_N and a server 200. Although FIG. 3 depicts the camera devices 100 and the server 200 as being independent elements, the invention is not limited thus. In a non-limiting example, the 3-dimensional information acquisition system 10 can have the camera devices 100 and the server 200 as a single module or system. In such a case, the camera devices 100 and the server 200 can exchange data through an electrically implemented internal signal transfer system.

A camera device 100 can perform the functions of photographing or capturing an object in a 3-dimensional space and projecting it onto a 2-dimensional plane. According to various embodiments, a camera device 100 can include, but is not limited to including, an optics unit, an image sensor, and a signal processing unit. Such a camera device 100 can be, for instance, an ultrahigh-speed camera device.

The optics unit can be operated by a mecha-shutter, a motor, and an actuator, where the actuator can perform operations such as zooming, focusing, etc. Such an optics unit can photograph or capture a surrounding image.

The image sensor can sense the image captured or photographed by the optics unit and convert it to electrical signals. Such an image sensor can include a CMOS or CCD sensor.

The image processing unit can buffer the frame images outputted from the camera device and, in a preview mode, can scale the frame images outputted from the camera device to a thumbnail size.

Also, the camera device 100 can include a communication module capable of transmitting a collected image or image to the server 200. The communication module can be implemented for wired communication (e.g. having a terminal or a connector, etc.) or wireless communication (e.g. Bluetooth, WiFi, etc.). Moreover, the camera device 100 can exchange data with the server 200 by using a network.

Also, in various embodiments of the present invention, the multiple camera devices 100 can use hardware/software of the same types and specifications for the configuring or calculating of camera parameters for 3-dimensional information acquisition, but the invention is not limited thus.

The server 200 may be an electronic device or a program that is connected electrically or connected for communication with the at least one camera devices 100 to perform and process an integrated function related to receiving images or images from the camera devices 100 and configuring, calculating, or calibrating a camera parameter. A more detailed description of the specific composition of such a server 200 is provided below with reference to FIG. 4.

Figure 4:
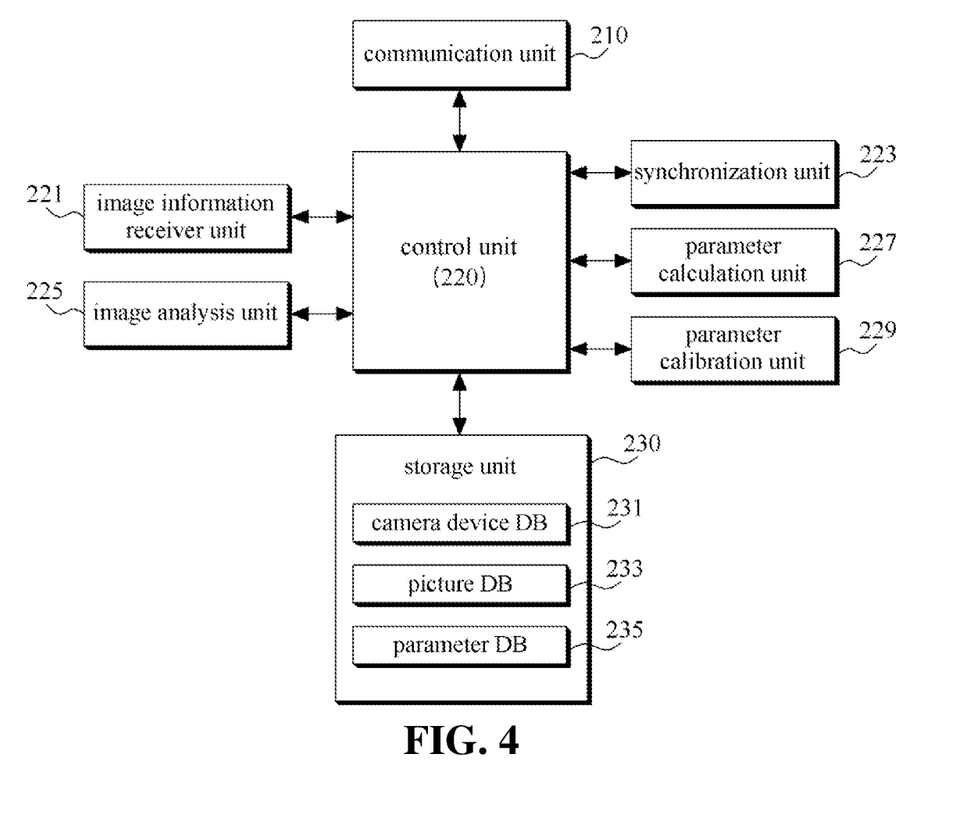
FIG. 4 is a block diagram of a server according to various embodiments of the present invention.

FIG. 4 is a block diagram of a server 200 according to various embodiments of the present invention.

According to various embodiments, the server 200 can include a communication unit 210, a control unit 220, an image information receiver unit 221, a synchronization unit 223, a image analysis unit 225, a parameter calculation unit 227, and a storage unit 230. In non-limiting embodiments, the server 200 can lack at least one of the components in FIG. 4 or further include additional components.

The communication unit 210 can provide communication connections between the camera devices 100 and the server 200. For example, the communication unit 210 can be connected to a network 300 via wireless or wired communication to receive image information containing a dynamic object (e.g. a ball used in pitching practice, etc.) from the camera devices 100. In non-limiting examples, if the server 200 and the camera devices 100 are provided as a single module, the communication unit 210 can be implemented as a circuit (e.g. bus) that transfers communications between the components.

The control unit 220 can control general operations such as controlling the power supply of the server 200, etc., and signal flow between the internal elements of the server 200 and can perform a data processing function of processing data. The control unit 220 can include at least one processor, where such a processor can include one or more of a central processing unit (CPU), an application processor (AP), and a communication processor (CP).

In an embodiment of the present invention, the control unit 220 can generate (e.g. by rendering) 3-dimensional information of a dynamic object based on a camera parameter calculated or calibrated at the parameter calculation unit 227 or the parameter calibration unit 229.

The image information receiver unit 221 can receive image information from each of the at least one camera devices 100. For example, the image information receiver unit 221 can receive image information through the communication unit 210.

The image information can be a still image or a moving image captured or photographed at the camera devices 100, and such image information can include the movement of a ball thrown by a pitcher at a site such as that for pitching practice. Here, the ball thrown by a pitcher can be a dynamic object used for configuring a camera parameter as described later on.

The image information receiver unit 221 can transfer each set of image information to the control unit 220, synchronization unit 223, image analysis unit 225, or storage unit 230. In a non-limiting example, the image information receiver unit 221 can assign an identifier for identifying the image information to each set of image information or preprocess the image before transferring the image information.

The synchronization unit 223 can synchronize each set of image information received from the image information receiver unit 221 or the control unit 220 or can transmit a synchronization signal (e.g. a trigger signal) to the multiple camera devices 100 so that the photographed image information may be synchronized.

More specifically, in order that the image information may be photographed at the multiple camera devices 100 at the same time point, the synchronization unit 223 can transmit a control signal for controlling the time point of photography of the camera devices 100 to each camera device 100 via the communication unit 210.

Also, in order to synchronize the sets of image information already photographed and transmitted from the multiple camera devices 100, the synchronization unit 223 can process or classify the image information received from each camera device 100.

For example, the synchronization unit 223 can check the metadata included in each set of image information. Such metadata can include, for instance, time information regarding the time at which the multiple number of frames forming the image information were recorded. The synchronization unit 223 can check the time information to group or classify the frames of each set of image information with respect to the same time point. In this case, each frame can include an image of the dynamic object in at least a partial area.

However, in various embodiments of the present invention in which it is premised that prior synchronization has been achieved, the synchronization unit 223 can be deactivated or omitted in FIG. 4.

The image analysis unit 225 can check the location information of the dynamic object in the image information received from the image information receiver unit 221 or the synchronization unit 223. For example, the image analysis unit 225 can check the location information of each dynamic object (e.g. ball) included in the image information for the same time point in the sets of image information (e.g. moving image) photographed for a particular area (e.g. pitching practice area).

According to various embodiments, the image analysis unit 225 can extract or classify images corresponding to the same time point from the respective sets of image information received from the multiple camera devices 100 and can check the coordinate information of the region in which the dynamic object is present in the extracted or classified image (e.g. frame).

Also, the image analysis unit 225 can transfer the checked coordinate information to the control unit 220, parameter calculation unit 227, or storage unit 230.

The parameter calculation unit 227 can receive the coordinate information of the dynamic object from the control unit 220, image analysis unit 225, or storage unit 230. Also, the parameter calculation unit 227 can calculate 3-dimensional information (e.g. 3-dimensional coordinates) of the dynamic object and the camera parameter based on the planar coordinate information of the dynamic object, a 3-dimensional world coordinate system (e.g. world coordinate system) and a predefined transformation algorithm (e.g. a transformation matrix or transformation equation). In this case, the coordinate information of the dynamic object can be, for instance, the coordinate information of a counterpart point corresponding to a particular point from among the location information of the dynamic object. The algorithm for obtaining such 3-dimensional information of the dynamic object or the camera parameter can be achieved through various known methods as mentioned above and is not limited to a particular method.

According to various embodiments, the parameter calculation unit 227 can change or update the camera parameter based on accumulated image information. For example, the multiple camera devices 100 can generate and accumulate image information by photographing the repeated movements of the ball during multiple rounds of pitching practicing and can transmit the generated image information to the server 200.

Then, the parameter calculation unit 227 can change the calculated or configured camera parameter based on the newly received image information. Also, the parameter calculation unit 227 can store the changed or updated camera parameter in the storage unit 230.

Next, the parameter calibration unit 229 can perform a function of calibrating the camera parameter. Such a parameter calibration unit 229 can calibrate the camera parameter through a calibration algorithm using $2^{nd}$ order curve modeling or a calibration algorithm using 3-dimensional plane modeling.

While the parameter calibration unit 229 can combine the $2^{nd}$ order curve modeling and the 3-dimensional plane modeling (e.g. by performing the 3-dimensional plane modeling after the $2^{nd}$ order curve modeling), the invention is not limited thus, and the $2^{nd}$ order curve modeling and the 3-dimensional plane modeling can be performed independently. Also, the parameter calibration unit 229 can generate 3-dimensional information regarding the trajectory of the dynamic object during the process of calibrating the camera parameter.

According to various embodiments, the parameter calibration unit 229 can detect consecutive 2-dimensional location information associated with the movement of the dynamic object from the image information and, based on the detected 2-dimensional location information, can model the trajectory of the dynamic object as a $2^{nd}$ order curve. Also, the parameter calibration unit 229 can correct the 2-dimensional location information in such a way that the 2-dimensional location information of the dynamic object that deviates from the $2^{nd}$ order curve by a particular distance or further is positioned on at least some points of the $2^{nd}$ order curve. Also, the parameter calibration unit 229 can calibrate the camera parameter based on the calibrated 2-dimensional location information.

According to still another embodiment, the parameter calibration unit 229 can render 3-dimensional information representing the trajectory of the dynamic object based on the calibrated camera parameter. In this case, the rendered 3-dimensional information can include consecutive 3-dimensional location information of the dynamic object. Also, the parameter calibration unit 229 can model the trajectory of the dynamic object as a 3-dimensional plane based on the rendered 3-dimensional information. Then, the parameter calibration unit 229 can correct the 3-dimensional location information in such a way that the 3-dimensional location information of the dynamic object that deviates from the 3-dimensional plane by a particular distance or further is positioned on at least some points of the 3-dimensional plane and, based on the calibrated 3-dimensional location information, can calibrate the camera parameter.

According to certain embodiments, the parameter calibration unit 229 can detect new 2-dimensional location information based on the calibrated 3-dimensional location information and can correct the camera parameter by calibrating the new 2-dimensional location information based on a modeling of a new $2^{nd}$ order curve.

The storage unit 230 can store data that is received from or generated by the control unit 220, the server 200, or other components of the 3-dimensional information acquisition system 10. The storage unit 230 can, for example, include a memory, a cache, a buffer, etc., and can be composed of software, firmware, hardware, or a combination of at least two or more of the above.

According to various embodiments, the storage unit 230 can include a camera device DB 231, a image DB 233, and a parameter DB 235. Although the camera device DB 231, image DB 233, and parameter DB 235 are illustrated in the drawing as being divided within the storage unit 230, they are not limited to such a configuration and can be formed as a single module.

The camera device DB 231 can include hardware information and software information of the camera devices 100 as well as the identification information of each camera device 100. Such hardware information, software information, and identification information can be stored at the time the 3-dimensional information acquisition system 10 is implemented or can be updated at arbitrary time points to accompany changes or additions of the camera devices 100.

The image DB 233 can include the image information received from the camera devices 100. For example, the image information received from each camera device 100 can be classified according to certain time points or pitching actions or mapped as it is stored in the image DB 233, but the invention is not limited thus.

The parameter DB 235 can store camera parameters calculated at the parameter calculation unit 227, parameter calibration unit 229, or control unit 220. Also, the camera parameters can be computed and recorded for multiple rounds of pitching practice, and the parameter DB 235 can store the camera parameters with the camera parameters sorted, so that the sorted and stored camera parameters may be provided in response to a request from the parameter calculation unit 227. The provided camera parameters can be used in actions for calibrating camera parameters at the parameter calculation unit 227 or the parameter calibration unit 229.

The image information receiver unit 221, synchronization unit 223, image analysis unit 225, parameter calculation unit 227, and parameter calibration unit 229 described above can be forms for logically implementing the respective functions of the control unit 220 of the server 200. Thus, the image information receiver unit 221, synchronization unit 223, image analysis unit 225, parameter calculation unit 227, and parameter calibration unit 229, as well as the control unit 220, can also be formed as a single module.

Also, the functions of the image information receiver unit 221, synchronization unit 223, image analysis unit 225, parameter calculation unit 227, parameter calibration unit 229, and control unit 220 can be implemented in the form of routines, instructions, or programs stored in the storage unit 230 (e.g. memory).

Also, routines, instructions, or programs formed to perform the actions of the respective components of the image information receiver unit 221, synchronization unit 223, image analysis unit 225, parameter calculation unit 227, parameter calibration unit 229, and control unit 220 can be stored in a computer-readable storage medium. Such a storage medium may include all types of storage media that store programs and data for possible reading by a computer. Examples can include ROM (read-only memory), RAM (random access memory), CD (compact disk)- and DVD (digital video disk)-ROM, magnetic tape, floppy disks, optical data storage devices, flash memory devices, etc. Also, such a storage medium can be distributed over a computer system connected by a network to store and allow execution of computer-readable code in a distributed manner.

Figure 5:
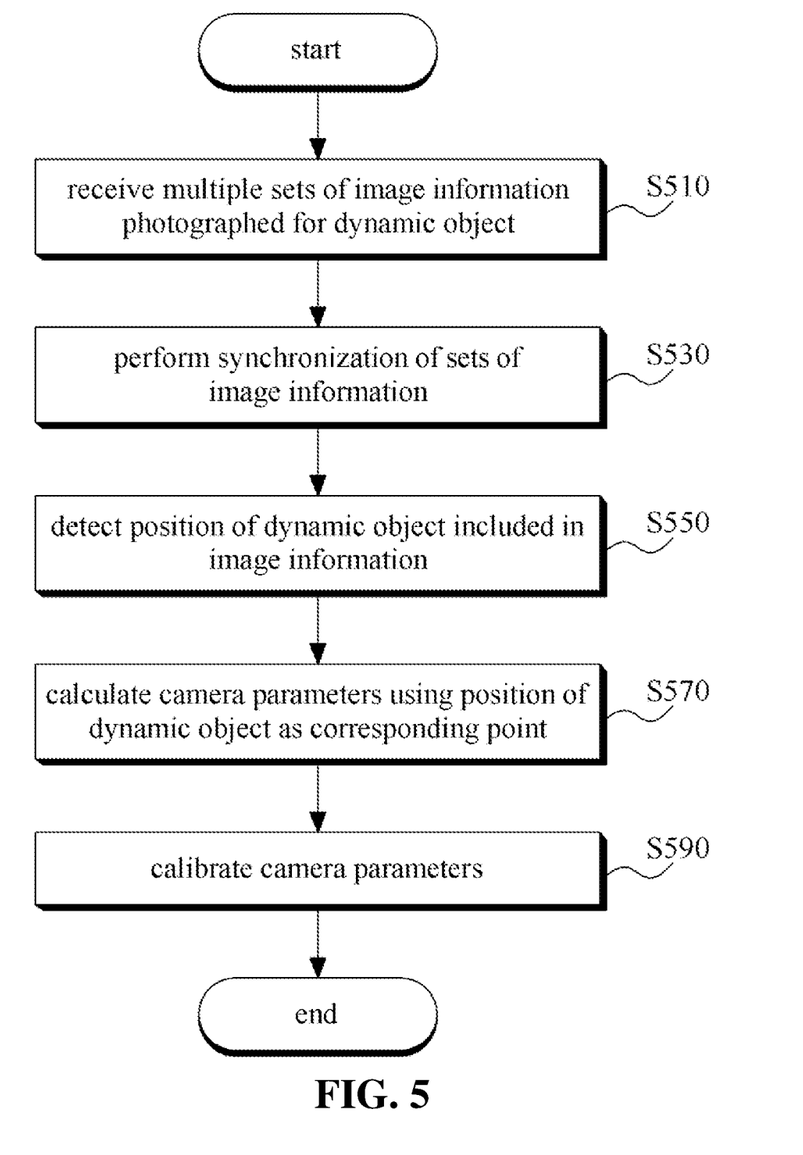
FIG. 5 is a flow diagram illustrating a method of calculating a parameter for 3-dimensional information acquisition at a server according to various embodiments of the present invention.

FIG. 5 is a flow diagram illustrating a method of calculating a parameter for 3-dimensional information acquisition at a server 200 according to various embodiments of the present invention.

First, in operation S510, the server 200 can receive multiple sets of image information photographed for a dynamic object. More specifically, at least two or more camera devices 100 can, in real time, periodically, or for a preconfigured duration of time, photograph a dynamic object moving at a particular speed in a particular space and can transmit the image information generated by the photography to the server 200.

For example, a multiple number of camera devices 100 can be placed in a particular interval in a space such as a baseball stadium or a baseball practice ground, etc., to photograph a ball thrown by a pitcher from a particular angle and in a particular image quality and a particular resolution. In this way, the camera devices 100 can generate image information that includes the trajectory of the ball and transmit the generated image information to the server 200.

Next, in operation S530, the server 200 can perform an action of synchronizing the sets of image information. However, in cases where the synchronization action for the sets of image information is unnecessary or has already been performed as described above, this operation can be omitted.

Next, in operation S550, the server 200 can detect the position of the dynamic object included in the image information. More specifically, the server 200 can check the location information of each dynamic object included in each set of image information for the same time point from the image screens (e.g. frames) of the image information. For example, the server 200 can extract images (e.g. images including the ball) corresponding to the same time point from the image information respectively and can check the plane coordinate information of the area in which the dynamic object (e.g. ball) is present from the extracted images respectively.

Next, in operation S570, the server 200 can configure or calculate camera parameters using the checked position of the dynamic object as a corresponding point. Based on the camera parameter configured or calculated in this way, 3-dimensional information for the dynamic object can be generated.

According to various embodiments, the corresponding point can be a particular point that is set arbitrarily from among the areas of the dynamic object photographed by the camera devices 100 for calculating a camera parameter or acquiring 3-dimensional information. Whereas methods according to the related art that utilize fixed objects commonly detect the corner points for use as corresponding points, various embodiments of the present invention can set at least a partial area or a particular point of an area corresponding to the dynamic object as a corresponding point.

For example, a corresponding point can be set as a particular point (e.g. a point on a ball) or a partial area (e.g. a partial area of the ball) of the location information of a dynamic object (e.g. ball), and such setting of the corresponding point can be configured at an arbitrary time point or according to a predefined policy at the 3-dimensional information acquisition system 10 by the administrator of the server 200.

The server 200 can calculate the 3-dimensional information and camera parameter of the dynamic object based on the plane coordinate information of the corresponding point, a 3-dimensional world coordinate system, and a predefined transformation algorithm.

Next, in operation S590, the server 200 can correct the calculated camera parameters.

The trajectory of the ball photographed at each camera device 100 may be present on a curve, but there is a possibility that the procedure of detecting the position of the ball at the server 200 may entail cases where inaccurate positions are detected.

For example, as the ball position detection is performed at the pixel level in the images, accurate position detection may be impossible, and since the ball exposed in the images are photographed to be closer to elliptical shapes rather than circular shapes and due to the image environment, it can be difficult to detect the center position of the ball accurately. Therefore, there is a need for a method of calibrating the camera parameter by calibrating the detected positions of the ball.

Figure 6:
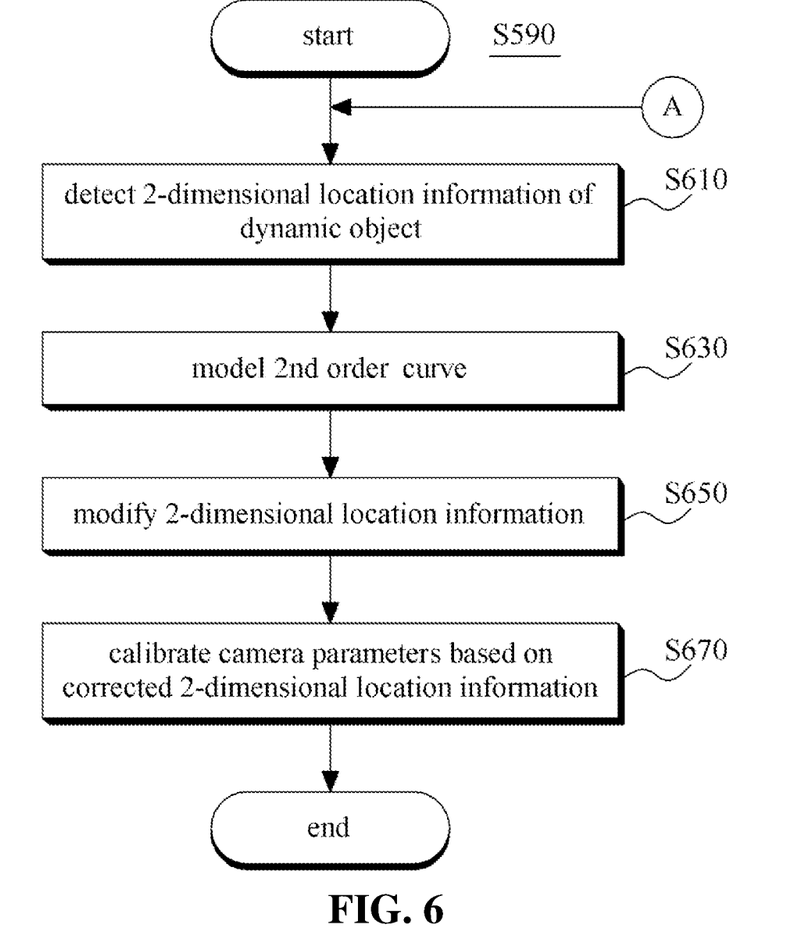
FIG. 6 is a flow diagram illustrating a method of calibrating a camera parameter through $2^{nd}$ order curve modeling at a server according to various embodiments of the present invention.
Figure 7:
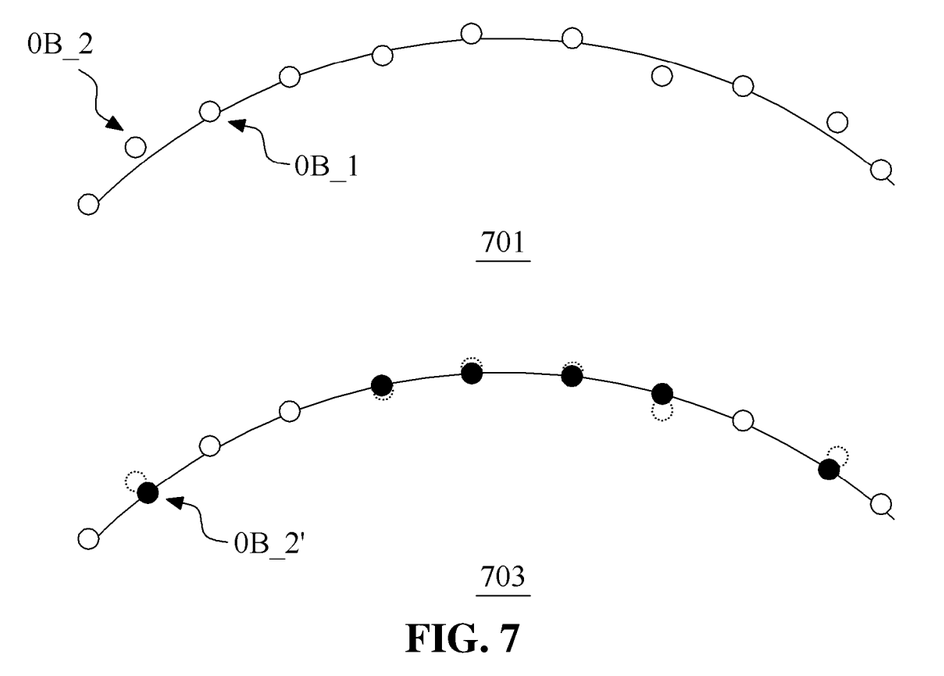
FIG. 7 is an example diagram illustrating a method of calibrating a camera parameter through curve modeling.
Figure 8:
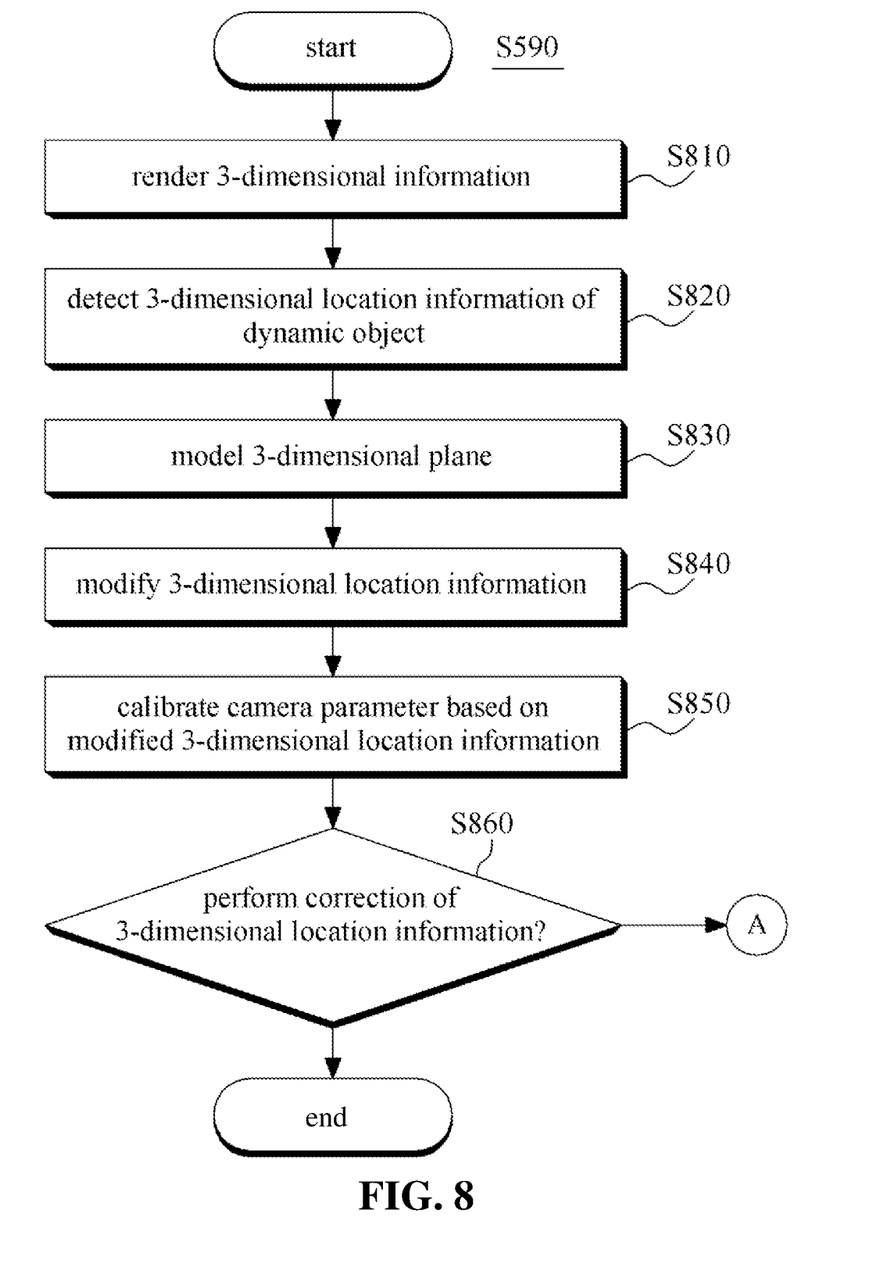
FIG. 8 is a flow diagram illustrating a method of calibrating a camera parameter through 3-dimensional plane modeling at a server according to various embodiments of the present invention.
Figure 9:
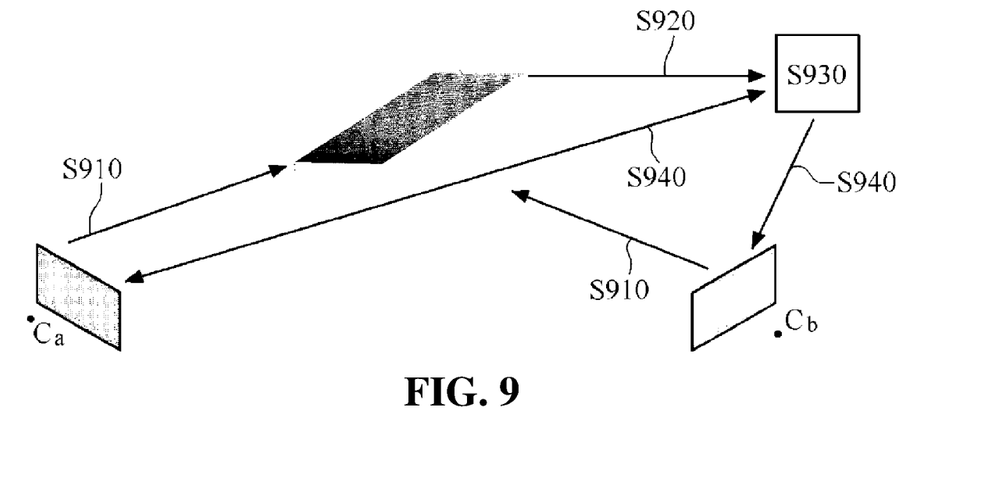
FIG. 9 and FIG. 10 are example diagrams diagram illustrating a method of calibrating a camera parameter through plane modeling.
Figure 10:
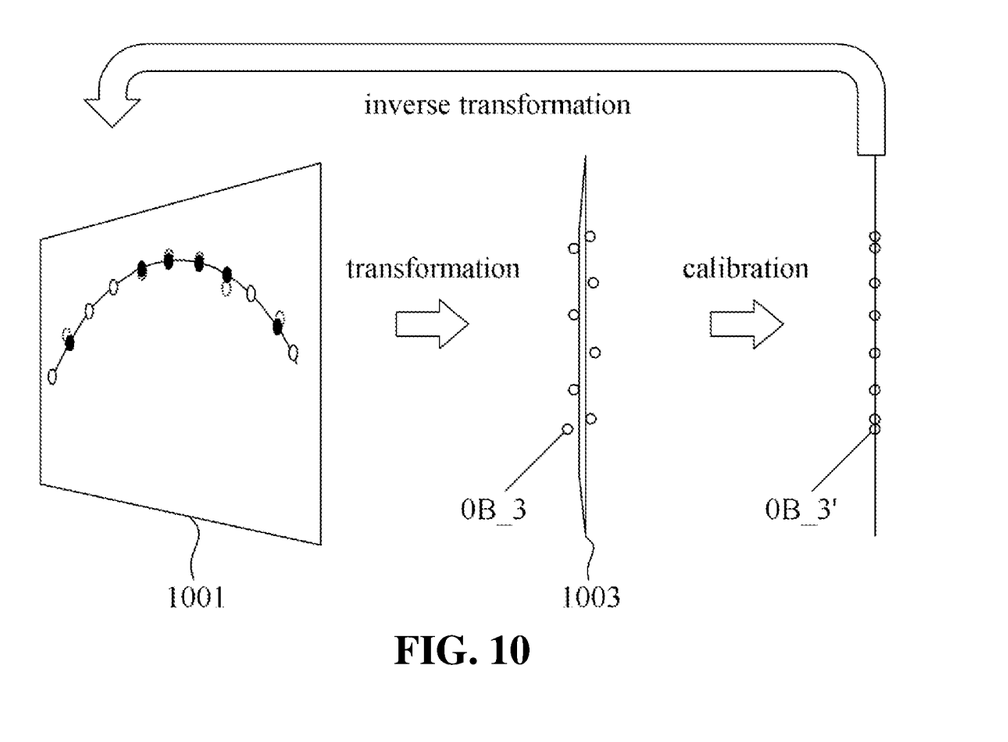

Various embodiments of the present invention disclose methods of calibrating the camera parameter, FIG. 6 and FIG. 7 illustrating a method utilizing a first calibration algorithm, and FIG. 8 to FIG. 10 illustrating a method utilizing a second calibration algorithm.

FIG. 6 is a flow diagram illustrating a method of calibrating a camera parameter through $2^{nd}$ order curve modeling at a server 200 according to various embodiments of the present invention. The descriptions relating to FIG. 6 can apply to an example of operation S590 in FIG. 5. FIG. 7 is an example diagram illustrating a method of calibrating a camera parameter through curve modeling.

According to various embodiments, in operation S610, the server 200 can detect 2-dimensional location information of the dynamic object. For example, based on the location information of the dynamic object detected in operation S550 of FIG. 5, the server 200 can additionally detect consecutive 2-dimensional location information photographed according to the movement of the dynamic object.

Next, in operation S630, the server 200 can model a $2^{nd}$ order curve, such as those illustrated in FIG. 7, based on the detected 2-dimensional location information. The server 200 can use various algorithms or programs to model a $2^{nd}$ order curve such that the positional points of the dynamic object photographed at consecutive time points are positioned as close as possible to a particular curve.

Next, in operation S650, the server 200 can modify the 2-dimensional location information of the dynamic object based on the modeled $2^{nd}$ order curve. For example, the server 200 can correct the position of the second object OB_2 included in the pre-calibration screen 701 of FIG. 7 such that it is positioned on at least some points (OB_2') of the $2^{nd}$ order curve as in the post-calibration screen 703. In this case, the server 200 can calibrate the 2-dimensional location information such that the center point of the second object OB_2 is positioned on the $2^{nd}$ order curve.

Next, in operation S670, the server 200 can calibrate the camera parameters based on the calibrated 2-dimensional location information of the dynamic object.

FIG. 8 is a flow diagram illustrating a method of calibrating a camera parameter through 3-dimensional plane modeling at a server 200 according to various embodiments of the present invention. The descriptions relating to FIG. 8 can apply to an example of operation S590 in FIG. 5. For convenience, the descriptions are provided with reference to FIG. 9 and FIG. 10. FIG. 9 and FIG. 10 are example diagrams diagram illustrating a method of calibrating a camera parameter through plane modeling.

According to various embodiments, in operation S810, the server 200 can render the 3-dimensional information of the dynamic object. For example, the server 200 can apply rendering for the 3-dimensional information of the dynamic object based on the camera parameter calculated in operation S570 of the FIG. 5 or the camera parameter calibrated in operation S590. In this case, the rendered 3-dimensional information can include the consecutive 3-dimensional location information of the dynamic object. FIG. 9 illustrates the 3-dimensional information of the dynamic object in a recovered state (S910: recovery of the 3-dimensional information of the ball).

Next, in operation S820, the server 200 can detect the 3-dimensional location information of the dynamic object. Such 3-dimensional location information of the dynamic object can be extracted during the rendering process of the 3-dimensional information or before/after the rendering process, but the invention is not limited thus.

Next, in operation S830, the server 200 can model a 3-dimensional plane. FIG. 9 illustrates a plane modeling action of the rendered 3-dimensional information (S920: 3-dimensional plane modeling). The 3-dimensional plane can be, for instance, a plane in third dimensions formed to include the consecutive trajectory of the ball thrown at the pitching site. Similar to the curve modeling in two dimensions, the server 200 can use various algorithms or programs to model the trajectory of the dynamic object as a 3-dimensional plane.

Next, in operation S840, the server 200 can modify the 3-dimensional location information based on the modeled 3-dimensional plane. FIG. 9 illustrates an action for calibrating the 3-dimensional location information (S930: planar projection such that 3-dimensional position is present on the plane and calibration of 3-dimensional information). More specifically, when modeling a 3-dimensional plane 1003 as in FIG. 10, the server 200 may check that a position OB_3 of the dynamic object photographed at a particular time point deviates by a particular distance or further from the 3-dimensional plane.

To correct this, the server 200 can adjust the dynamic object to a new position OB_3' by calibrating the previous position OB_3 of the dynamic object to be placed on at least some points of the 3-dimensional plane. For example, the server 200 can correct the 3-dimensional location information such that the center point of the dynamic object is positioned on the 3-dimensional plane.

Next, in operation S850, the server 200 can calibrate the camera parameter based on the modified 3-dimensional location information. FIG. 9 illustrates an action of calibrating the camera parameter (S940: camera external parameter calibration).

Next, in operation S860, the server 200 can determine whether or not to perform a correction of the 2-dimensional location information. Such determining action can be performed in various ways according to the administrator of the server 200 or a predefined server policy, etc.

A reason for performing 2-dimensional location information calibration is that the 2-dimensional location information may be changed due to the 3-dimensional location information calibration. In an embodiment of the present invention, a calibration of 3-dimensional location information can be performed after a calibration of 2-dimensional location information, but the calibration of the 3-dimensional location information can cause the previously calibrated 2-dimensional location information to change. However, since the error of the changed 2-dimensional location information would be smaller than the previous value before the calibration of the 2-dimensional location information, a minimum error value can be obtained by repeating the two calibration algorithms. An example of such repetitive algorithms is illustrated in FIG. 10.

When it is needed to perform a calibration of 2-dimensional location information, the server 200 can perform (or re-perform) the action of 2-dimensional location information calibration of FIG. 6. In this case, the server 200 can provide the calibrated 3-dimensional location information as the input value for operation 610 of FIG. 6. That is, the server 200 can detect the 2-dimensional location information from the calibrated 3-dimensional location information.

With embodiments such as those described above, camera parameters can be calculated at a place where pitching practice, etc., is performed, based on a dynamic object (e.g. ball) that can be photographed during the pitching practice instead of using a separate fixed object, so that camera parameters can be calculated or 3-dimensional information can be acquired in a simple manner without separate arbitrary preparation procedures or unnecessary preparation procedures.

In other words, whereas the related art requires a pattern, etc., for calculating camera parameters separately from to the dynamic object for generating 3-dimensional information, the present invention makes it possible to calculate camera parameters by using the dynamic object for generating 3-dimensional information and to generate 3-dimensional information for the dynamic object by using the calculated camera parameters.

The term "module" or "unit" used in regard to various embodiments of the present invention can refer to a unit including one of or a combination of two or more of hardware, software, and firmware. A "module" or "unit" can be used interchangeably with terms such as part, logic, logical block, component, circuit, etc. A "module" or "unit" can be a minimum unit of a component formed as an integral body or a portion thereof or a minimum unit for performing one or more functions or a portion thereof. A "module" or "unit" can be implemented mechanically or electronically. For example, a "module" or "unit" according to various embodiments of the present invention can include at least one or more of an ASIC (application-specific integrated circuit) chip, a FPGA (field-programmable gate array) or a programmable logic device, either currently known or developed in the future, for performing certain operations.

A module or programming module according to various embodiments of the present invention can include at least one or more of the elements described above, can lack one or more elements, or can further include one or more additional elements. The operations performed by the modules, programming modules, or other elements according to various embodiments of the present invention can be executed by a sequential, parallel, iterative, or heuristic method. Also, certain operations can be executed in a different order, can be omitted, or can be accompanied by other operations.

What is claimed is:

1. A method of calculating camera parameters at a server for 3-dimensional information acquisition, the method comprising:
    receiving image information of a dynamic object moving at a particular speed from at least two or more camera devices;
    checking a respective set of location information of the dynamic object included in the image information received from each camera device at a same time; and
    calculating the camera parameters representing a relationship between the camera devices by using at least a portion of the respective set of the checked location information as a corresponding point,
    wherein the calculating of the camera parameters comprises:
    determining a first camera parameter based on the dynamic object moved during a first pitching practice;
    determining a second camera parameter based on the dynamic object moved during a second pitching practice followed by the first pitching practice; and
    correcting the first camera parameter based on the second camera parameter.

2. The method of calculating the camera parameters according to claim 1, wherein the checking of the location information of the dynamic object comprises:
    extracting an image corresponding to a same timeframe from the respective image information; and
    checking plane coordinate information of a region in which the dynamic object is present in each of the extracted images.

3. The method of calculating the camera parameters according to claim 1, wherein the image information includes a ball thrown in a pitching practice space as the dynamic object.

4. The method of calculating the camera parameters according to claim 1, wherein the camera parameters represent distance information between the camera devices.

5. A method of calculating camera parameters at a server for 3-dimensional information acquisition, the method comprising:
    receiving image information of a dynamic object moving at a particular speed from at least two or more camera devices;
    checking a respective set of location information of the dynamic object included in the image information received from each camera device at a same time; and
    calculating the camera parameters representing a relationship between the camera devices by using at least a portion of the respective set of the checked location information as a corresponding point,
    detecting consecutive 2-dimensional location information from the image information, the consecutive 2-dimensional location information associated with a movement of the dynamic object;
    modeling a trajectory of the dynamic object as a $2^{nd}$ order curve based on the 2-dimensional location information;
    modifying the 2-dimensional location information such that the 2-dimensional location information of the dynamic object deviating by a particular distance or greater from the $2^{nd}$ order curve is positioned on at least two points of the $2^{nd}$ order curve; and
    calibrating the camera parameters based on the modified 2-dimensional location information.

6. The method of calculating the camera parameters according to claim 5, further comprising:
    rendering 3-dimensional information representing the trajectory of the dynamic object based on the calibrated camera parameters, the rendered 3-dimensional information comprising consecutive 3-dimensional location information of the dynamic object;
    modeling the trajectory of the dynamic object as a 3-dimensional plane based on the rendered 3-dimensional information;
    modifying the 3-dimensional location information such that the 3-dimensional location information of the dynamic object deviating by a particular distance or greater from the 3-dimensional plane is positioned on at least two points of the 3-dimensional plane; and calibrating the camera parameters based on the modified 3-dimensional location information.

7. The method of calculating the camera parameters according to claim 6, further comprising:
calibrating the camera parameters by detecting new 2-dimensional location information based on the modified 3-dimensional location information and modifying the new 2-dimensional location information based on a new $2^{nd}$ order curve modeling.

8. A server configured to calculate camera parameters for 3-dimensional information acquisition, the server comprising:
a communication unit;
an image information receiver unit configured to receive image information of a dynamic object moving at a particular speed via the communication unit from at least two or more camera devices;
an image analysis unit configured to check a respective set of location information of the dynamic object included in the image information received from each camera device at a same time; and
a parameter calculation unit configured to calculate the camera parameters representing a relationship between the camera devices by using at least a portion of the respective set of the checked location information as a corresponding point,
wherein the parameter calculation unit determines a first camera parameter based on the dynamic object moved during a first pitching practice, determines a second camera parameter based on the dynamic object moved during a second pitching practice after the first pitching practice, and corrects the first camera parameter based on the second camera parameter.

9. The server of claim 8, wherein the image analysis unit extracts an image corresponding to a same time from the respective set of the image information and checks plane coordinate information of a region in which the dynamic object is present in each of the extracted images.

10. The server of claim 8, wherein the camera parameters represent distance information between the camera devices.

* * * * *